US006990765B1

(12) United States Patent
Beech

(10) Patent No.: US 6,990,765 B1
(45) Date of Patent: Jan. 31, 2006

(54) FLOATING BAIT CONTAINER

(76) Inventor: Joseph Beech, 1281 330th Ave., Tracy, MN (US) 56175

(*) Notice: Subject to any disclaimer, the term of this patent is extended or adjusted under 35 U.S.C. 154(b) by 124 days.

(21) Appl. No.: 10/301,772

(22) Filed: Nov. 21, 2002

(51) Int. Cl.
*A01K 97/04* (2006.01)

(52) U.S. Cl. .............................................. 43/55; 43/56

(58) Field of Classification Search .................... 43/55, 43/56

See application file for complete search history.

(56) References Cited

U.S. PATENT DOCUMENTS

| | | | | | |
|---|---|---|---|---|---|
| 292,123 | A | * | 1/1884 | Lindsay | 43/55 |
| 307,375 | A | * | 10/1884 | Busche | 43/56 |
| 1,841,956 | A | | 1/1932 | Juergens | |
| 2,040,559 | A | * | 5/1936 | Luttrell | 383/22 |
| 2,241,314 | A | * | 5/1941 | Mohler | 43/55 |
| 2,323,318 | A | * | 7/1943 | Farkas | 43/55 |
| 2,377,311 | A | * | 6/1945 | Capmbell | 383/121.1 |
| 2,603,028 | A | * | 7/1952 | Roberts | 43/55 |
| 3,025,629 | A | * | 3/1962 | Sears | 43/55 |
| 3,478,463 | A | * | 11/1969 | Ruter | 43/55 |
| 3,919,803 | A | * | 11/1975 | Manguso | 43/55 |
| 4,251,943 | A | * | 2/1981 | Sawlsville | 43/55 |
| 4,570,374 | A | * | 2/1986 | Baxley | 43/55 |
| 4,642,934 | A | * | 2/1987 | Carlson et al. | 43/55 |
| 4,858,372 | A | * | 8/1989 | Ray | 43/55 |
| 4,864,769 | A | * | 9/1989 | Sandahl | 43/55 |
| 4,890,413 | A | * | 1/1990 | Nelson et al. | 43/55 |
| 4,903,429 | A | * | 2/1990 | Tetenes | 43/44.99 |
| 4,905,404 | A | * | 3/1990 | Pasion et al. | 43/55 |
| 5,371,968 | A | * | 12/1994 | Casey | 43/25.2 |
| 5,722,197 | A | | 3/1998 | Albritton | |
| 6,105,305 | A | * | 8/2000 | Edens | 43/54.1 |
| 6,662,488 | B1 | * | 12/2003 | Heimbrock et al. | 43/55 |
| 2002/0162272 | A1 | * | 11/2002 | Pripusich | 43/54.1 |

OTHER PUBLICATIONS

New Product Announcement, North American Fisherman (Oct./Nov., 2002), p. 55.

Leech Tamer advertisement, JNB Originals http://www.driftbag.com.

* cited by examiner

*Primary Examiner*—Kurt Rowan
(74) *Attorney, Agent, or Firm*—Kinney & Lange, P.A.

(57) ABSTRACT

A collapsible live bait container constructed of a vinyl coated fabric mesh. The mesh is sewn over one or more flexibly resilient stays. A foam flotation member or buoyant stays can be secured to the enclosure walls. Resealing access ports are defined with strips of hook and loop fasteners, zippers or a fabric sleeve and drawstring. Several storage compartments can be provided with permanent or detachable walls or pockets.

4 Claims, 9 Drawing Sheets

FLOATING BAIT CONTAINER

BACKGROUND OF THE INVENTION

The present invention relates to live bait containers and, in particular, to a container having a fabric mesh sewn to rigid stays to define displaced walls and an enclosed storage cavity and including a resealing access port and a buoyant member sewn to the mesh walls.

A longstanding problem of live bait fishermen, who use minnows and other bait that must remain submerged in water, is providing a means for storing the bait while fishing. Varieties of rigid walled bait containers and traps with hinged doors and perforated walls exist. These containers are typically constructed from metallic mesh screen or perforated metal or plastic. These containers can be dragged from a boat or can be mounted inside a solid walled outer container that supports a quantity of water.

Rigid walled, built-in bait wells and/or live wells are also provided on many fishing boats. In lieu of towing the foregoing bait containers and depending upon the size of the live well, many of the foregoing bait containers can be inserted into a live well. The bait is thereby segregated from any fish that are caught and kept. Damage can occur, however, to the bait, captured fish, bait container and/or live well with normal jostling of the bait container during boat operation.

Mesh fabric outfitted with buoyant floats has also been used to store live bait such as leeches and as a holding pen for live wells. The walls of such assemblies, however, can collapse against the contained bait and/or fish and obstruct normal gill movement and breathing, thereby severely effecting bait mortality and storage time.

The present invention was developed to provide an economical mesh fabric, live bait container with a resealing access port that can support bait, such as minnows and other aquatic bait or insects (e.g. grasshoppers and crickets). The container and bait can be stored in a live well. The walls are displaced with resilient, flexible stays to define a bait storage space. One or more compartments can be provided to segregate multiple types or different species of bait. One or more buoyant floats can be included to support the container. The stays can flex during boat movement allowing the walls to collapse and expand. Damage is thereby minimized to the stored bait, fish, bait container and/or live well. The bait container can also be collapsed for storage.

SUMMARY OF THE INVENTION

It is a primary object of the invention to provide a collapsible bait container.

It is further object of the invention to provide a live bait container constructed with fabric mesh walls that are displaced with resiliently flexible stays.

It is further object of the invention to provide a fabric mesh live bait container having multiple compartments to segregate multiple types or different species of bait.

It is further object of the invention to provide a fabric mesh live bait container having one or more buoyant flotation members.

It is further object of the invention to provide a fabric mesh live bait container having a resealing access port.

It is further object of the invention to provide a fabric mesh live bait container having an access sleeve and drawstring closure.

The foregoing objects, advantages and distinctions of the invention are obtained in several presently preferred live bait containers. In several container constructions, a vinyl coated fabric mesh material is sewn over a pair of flexibly resilient stays to provide one or more storage compartments. A foam flotation member and/or secured or detachable secondary containers are secured to the walls of the container. Strips of hook and loop fasteners define resealing access ports to the interior.

In other constructions, zippers are provided and serve as the resealing access port. In still other constructions, a fabric sleeve and drawstring closure are sewn to the container and serve as the access port.

In still other constructions, the stays are constructed different materials including a nylon, plastic or polymer rod or cord stock, a buoyant cord (e.g. foam) or a resilient core piece (e.g. polymer, plastic or nylon) and covered with a buoyant outer shell.

Still other objects, advantages, distinctions and constructions of the invention will become more apparent from the following description with respect to the appended drawings. Similar components and assemblies are referred to in the various drawings with similar alphanumeric reference characters. The description therefore should not be literally construed in limitation of the invention. Rather, the invention should be interpreted within the broad scope of the further appended claims.

DESCRIPTION OF THE PREFERRED EMBODIMENT

Figure 1:
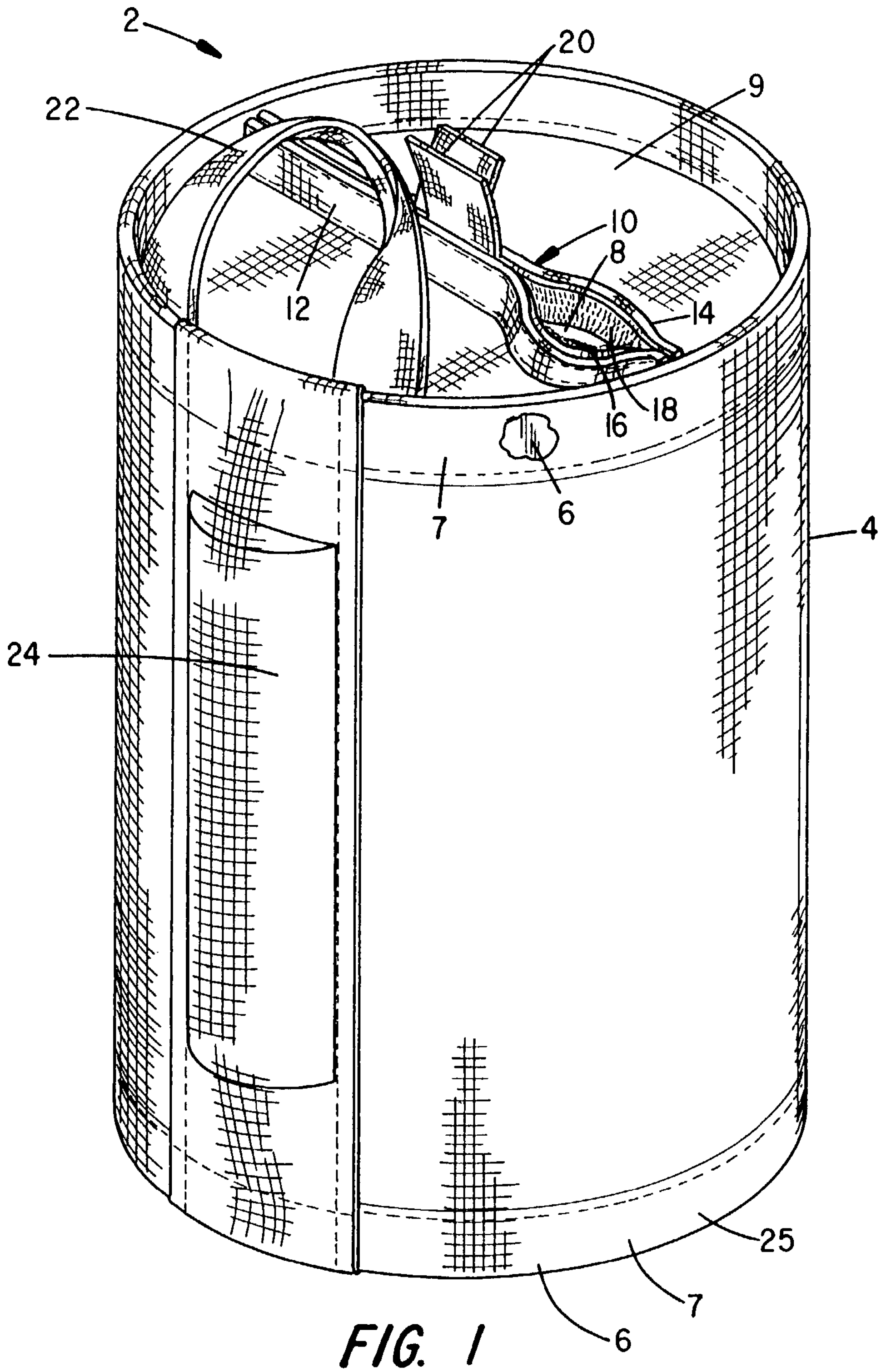
FIG. 1 is a perspective drawing showing a cylindrical mesh fabric container having a buoyant flotation member and an end access port defined with hook and loop fastener material.
Figure 2:
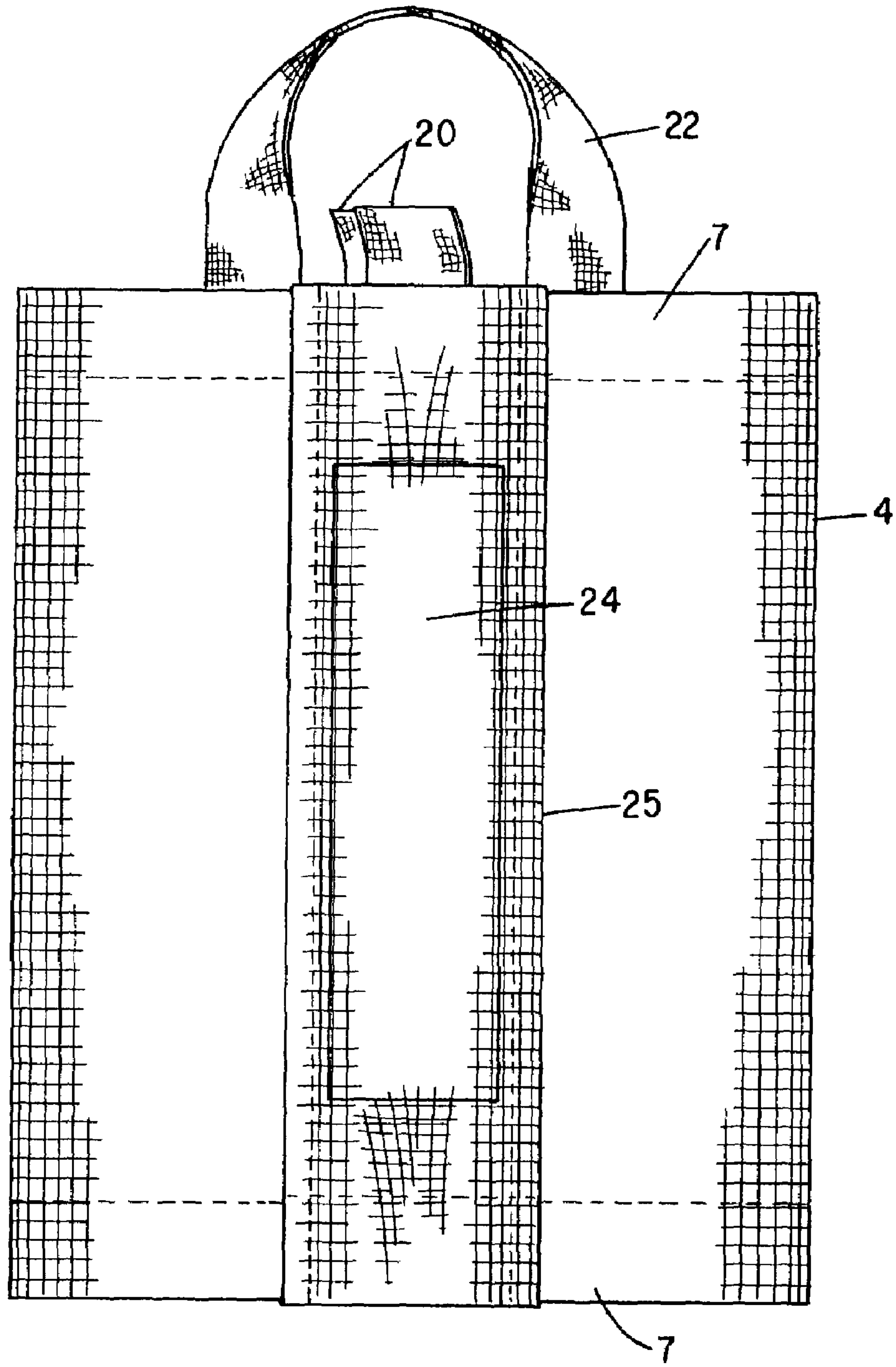
FIG. 2 is a front view thereof.
Figure 3:
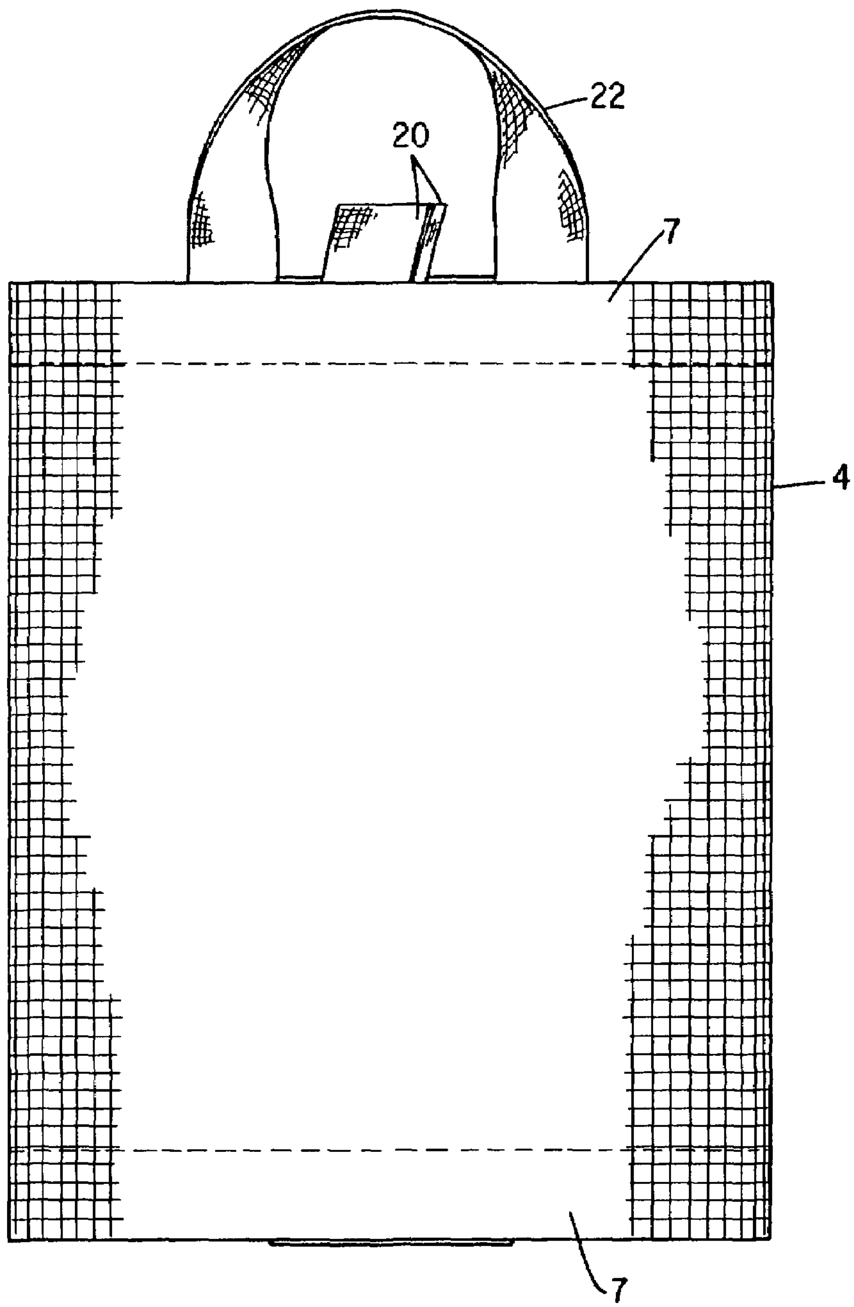
FIG. 3 is a rear view thereof.
Figure 4:
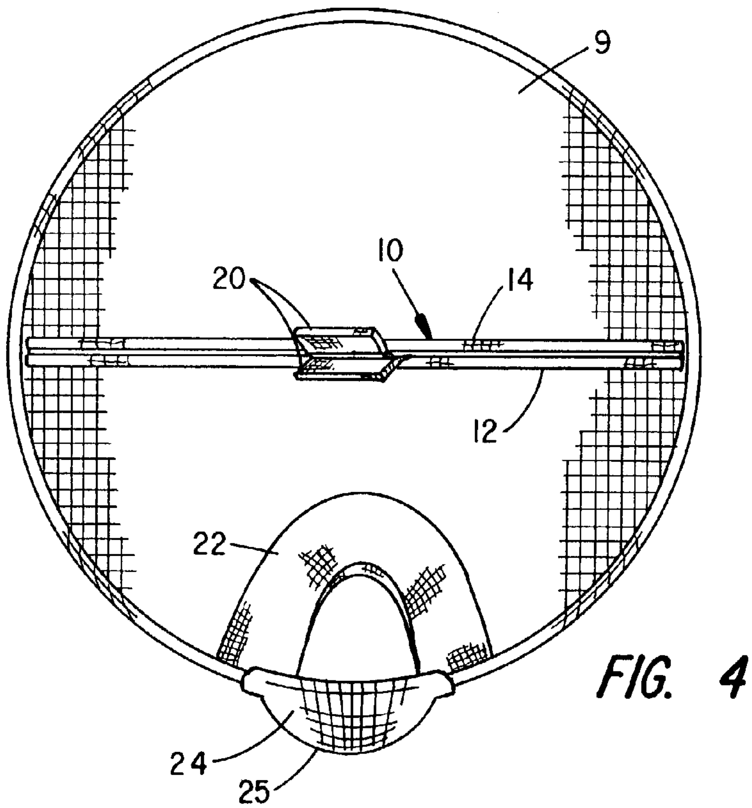
FIG. 4 is a view of the top or resealing end thereof.
Figure 5:
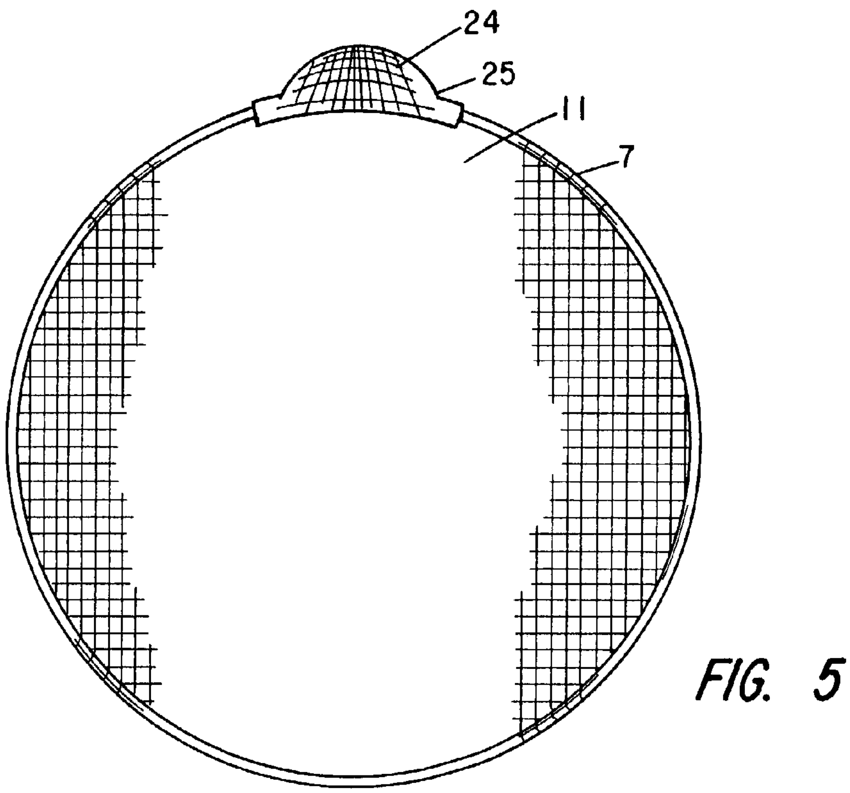
FIG. 5 is a bottom view thereof.

Referring to FIGS. 1 through 5, views are shown to a mesh fabric, live bait container 2. The sidewalls 4 of the container 2 are supported in a generally cylindrical shape via a pair of flexibly resilient stays or hoops 6. One of the stays 6 is shown in cutaway and is formed from a flat band of a water impermeable material (e.g. plastic or a coated material) that is rolled and sewn into a hem 7 at the end of the container 2. Each stay 6 generally defines an endless hoop, although several linear sections might be secured to the walls 4 to prevent the walls from collapsing against each other. The material used in the stays 6 is selected to be resistant to UV light and other environmental forces and to provide a sufficient resilience to return to shape, if distorted.

The shape, number and positioning of the stays 6 can be varied depending upon the geometry of a desired container.

A cylindrical container shape is presently preferred to facilitate transport of the container 2 to and from a bait shop in typically available buckets. The container 2 can be constructed with any combination of flat and/or arcuate walls.

Access to an interior storage space 8 is obtained through a resealing access port 10 at an end wall 9. The space 8 can be segregated into several compartments with suitable walls, reference FIG. 6, that can be permanently sewn into the container 2 or attached with strips of hook and loop material or other fasteners to the sidewall 4. The access port 10 can be formed into either of the end walls 9 or 11 or the sidewall 4. Any divider walls are typically positioned transverse to the access port 10 to facilitate access to each compartment.

The access port 10 is constructed of overlapping flaps 12 and 14 that are covered with hook and loop fastener material 16 and 18. Pull-tabs 20 are secured along the flaps 12 and 14 to facilitate opening or re-sealing the port 10. A looped, carry strap or handle 22 is also sewn to the hem 7 at end wall 9, although can be mounted anywhere on the container 2.

The container walls 4, 9 and 11 can be colored as desired; however, it has been found that minnows tend to collect and hover near dark colors. The end walls 9 and 11 are therefore typically colored black and the sidewall 4 is colored a contrasting color, such as fluorescent yellow or other lighter color, and against which the minnows are readily visible. The clustering of the bait at the ends 9 and 11 reduces bait movement and conserves energy, which provides for livelier bait action when the bait is presented later to a prey species.

Secured along a longitudinal side of the container 2 is a buoyant float 24. The float 24 is secured in a hemmed pocket 25. The float 24 is positioned to assure ready access to contained bait and is sized to support a specified amount of bait. The shape, number and positioning of any floats 24 can be selected as desired. Presently, the float 24 exhibits a half-moon profile.

The float 24 orients the container 2 to minimize forces that might act to open the access port 10 during normal container movements in a live well. The float 24 also acts as a bumper to prevent injuring stored bait or permanently damaging the container 2. The flexible stays 6 and walls 4, however, are able to distort and collapse as the container 2 is jostled. Multiple floats 24 and/or weights (not shown) can be positioned around the walls of the container 2 to properly balance the container 2 and preferably maintain the access port 10 at the surface to avoid spillage of bait in the event the port 10 opens during jostling or is inadvertently not closed.

The container 2 might also be tethered to an anchor and suspended in a body of water at a suitable depth and/or thermocline to facilitate bait storage between fishing excursions. If submerged, a tether line and marker buoy (not shown) that floats at the surface can also be secured to the container 2 to facilitate retrieval.

The size of the storage space 8 can be varied to accommodate different volumes of bait. Once filled, the container 2 is normally supported in a bucket for transport to a holding area, for example, a live well or lake. Containers 2 of the present type have found particular application for segregating bait from captured fish in boat live wells. Commercial bait dealers also use several containers for segregating distinct sizes and species of bait in aerated storage tanks during transport.

Figure 6:
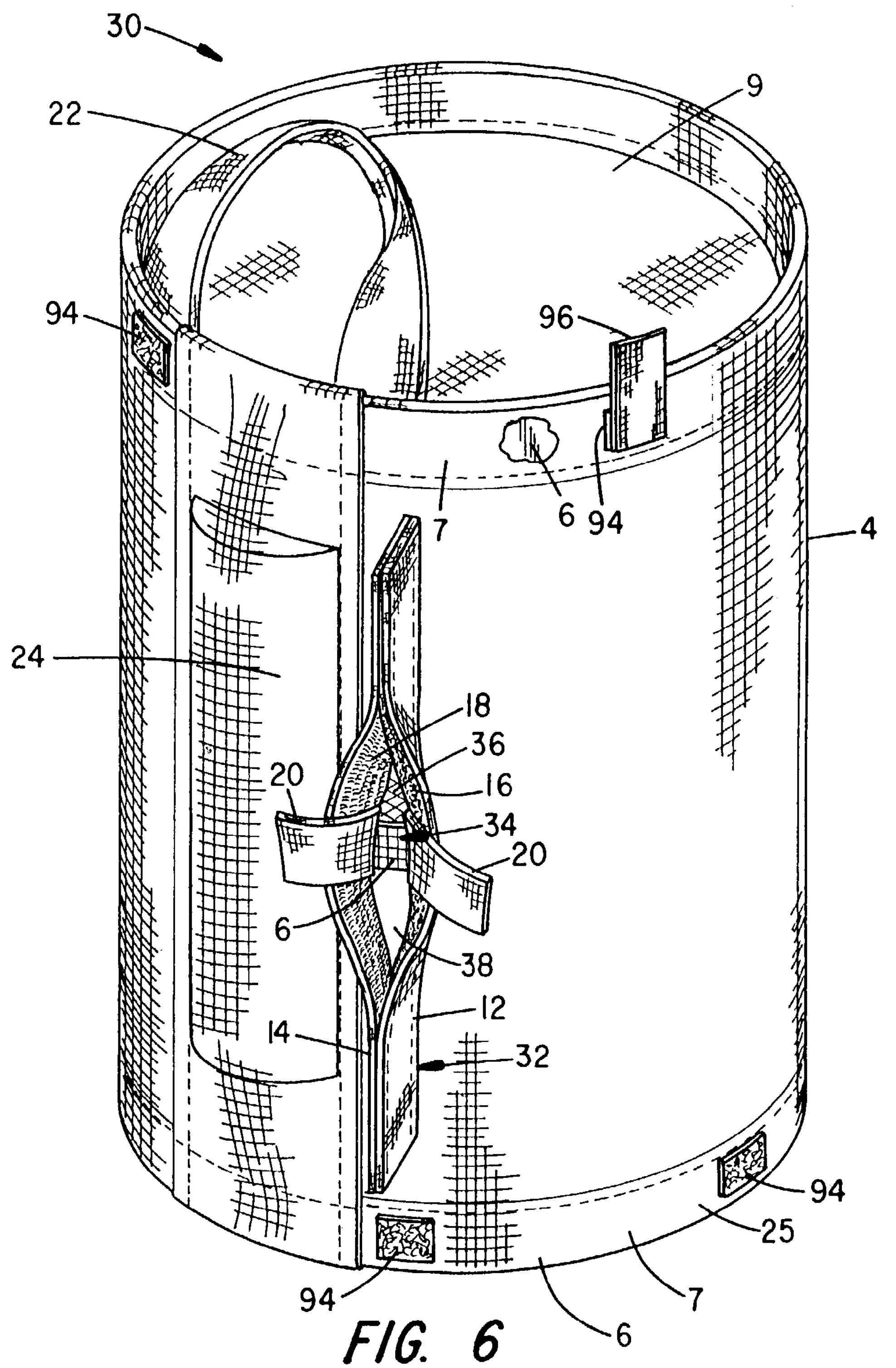
FIG. 6 is a front view of a container having a longitudinal hook and loop access port.

FIG. 6 depicts an alternative container 30 that is substantially identical to the container 2, except that an access port 32 extends longitudinally along the sidewall 4. The port 32 is sealed with strips 16 and 18 of hook and loop fastener material. The container 30 is also shown with a mesh divider wall 34 that can be secured to the walls 4 to define separate storage compartments 36 and 38. Multiple species (e.g. leeches and minnows) or different types of a species might be stored in the different compartments 36 and 38. A stay 6 can be provided at the periphery of the divider 34 and the divider 34 can be secured permanently or with strips of hook and loop fastener material to the walls 4.

Figure 7:
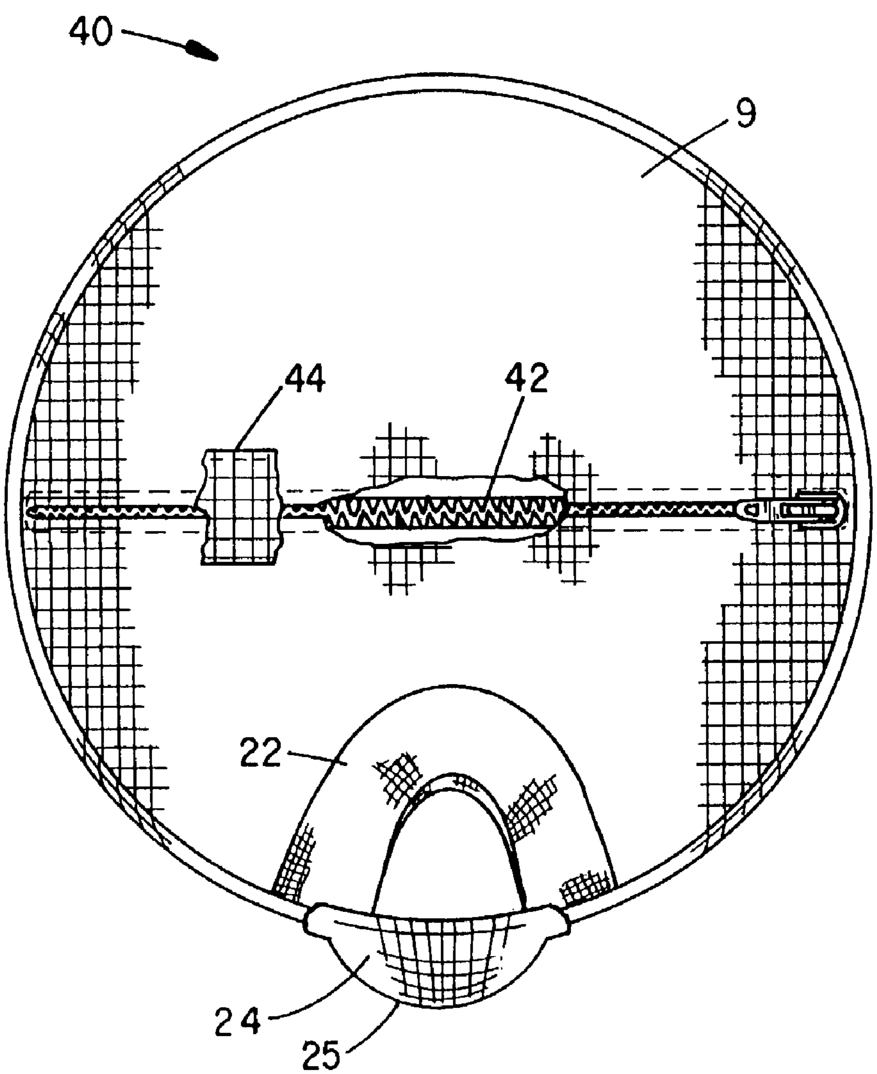
FIG. 7 is an end view of a container having an end zipper access port.
Figure 8:
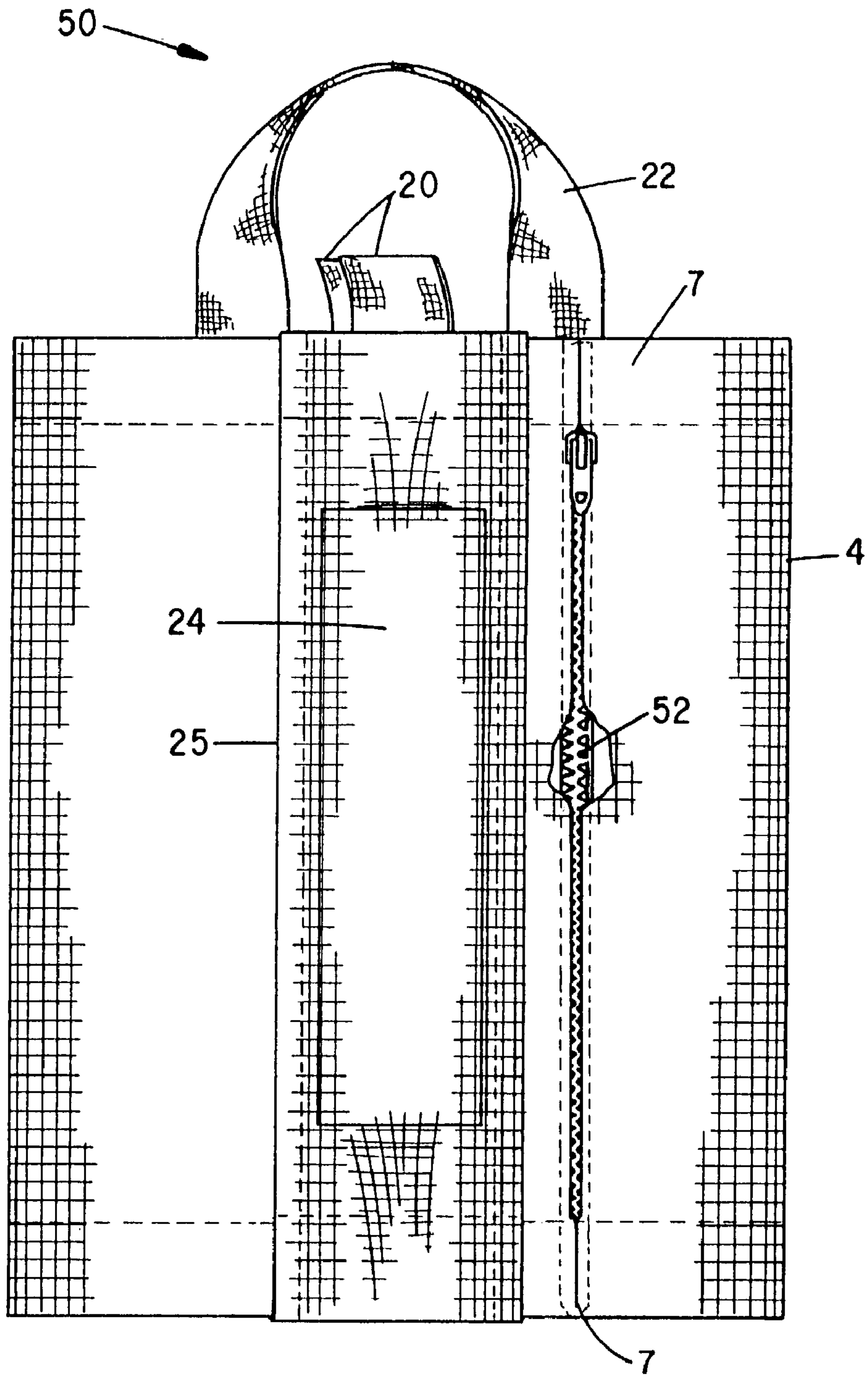
FIG. 8 is a front view of a container having a longitudinal zipper access port.

FIGS. 7 and 8 depict alternative containers 40 and 50, which provide end and longitudinal zippers 42 and 52 and portions of which are shown in enlarged scale. The zippers 42 and 52 are secured such that the fabric mesh is closely fit to the zippers 42 and 52. A cover flap 44 (shown in partial cutaway) might also be sewn to the walls 4, 9 and 11 to cover the zippers 42 and 52 and reduce possible escape of bait, if the containers 40 and 50 are accessed while floating.

Figure 9:
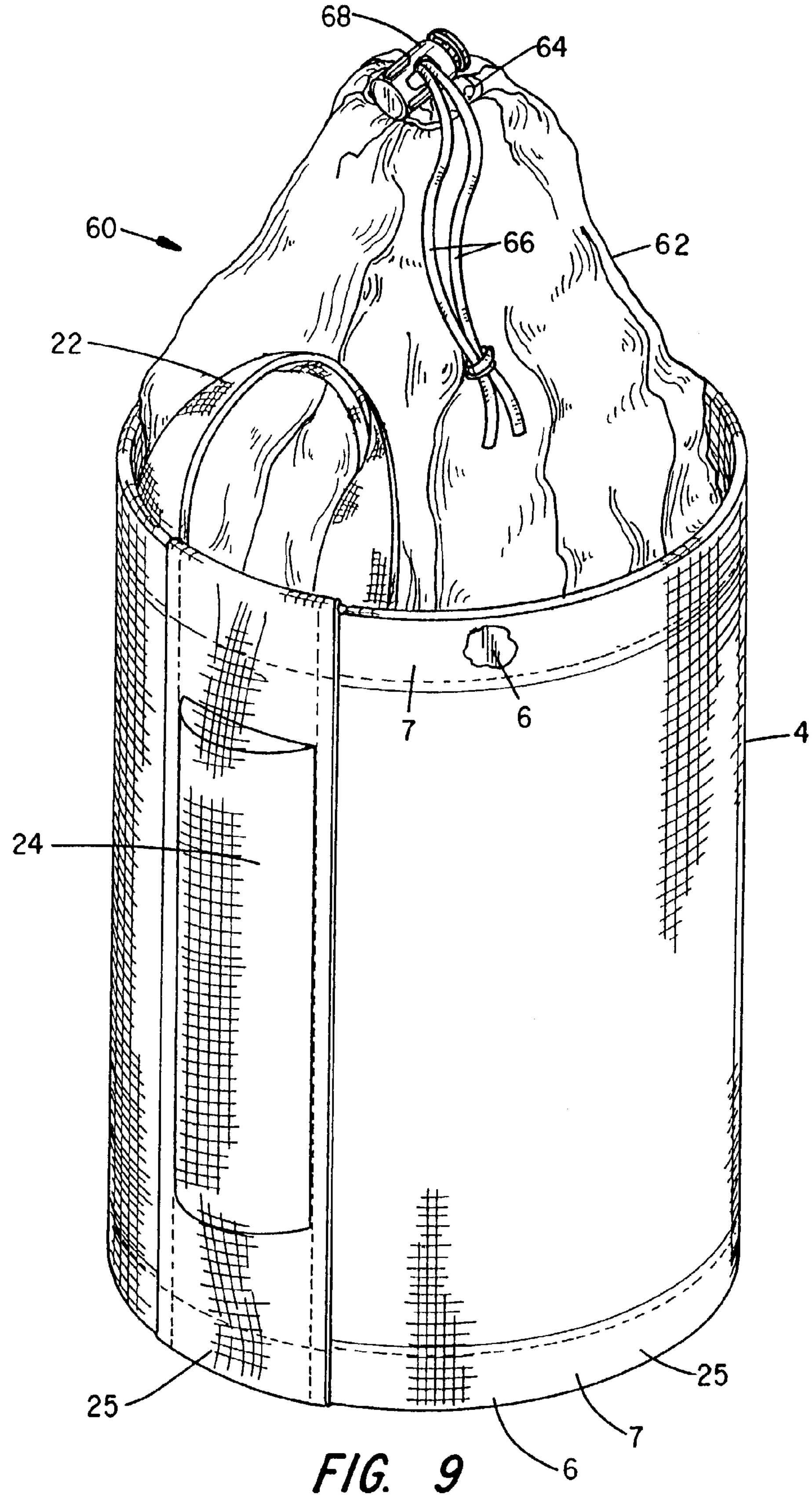
FIG. 9 is a perspective drawing showing a container having a domed end with a drawstring closure.

FIG. 9 discloses a container 60 having a porous fabric sleeve or end cowling-piece 62. The sleeve 62 is sewn to the hem 7 and provides an opening 64 that is bounded by drawstrings 66 and a sliding pinch fastener 68. The opening 64 can be adjusted to fit closely about the arm to minimize bait escaping during removal.

Figure 10:
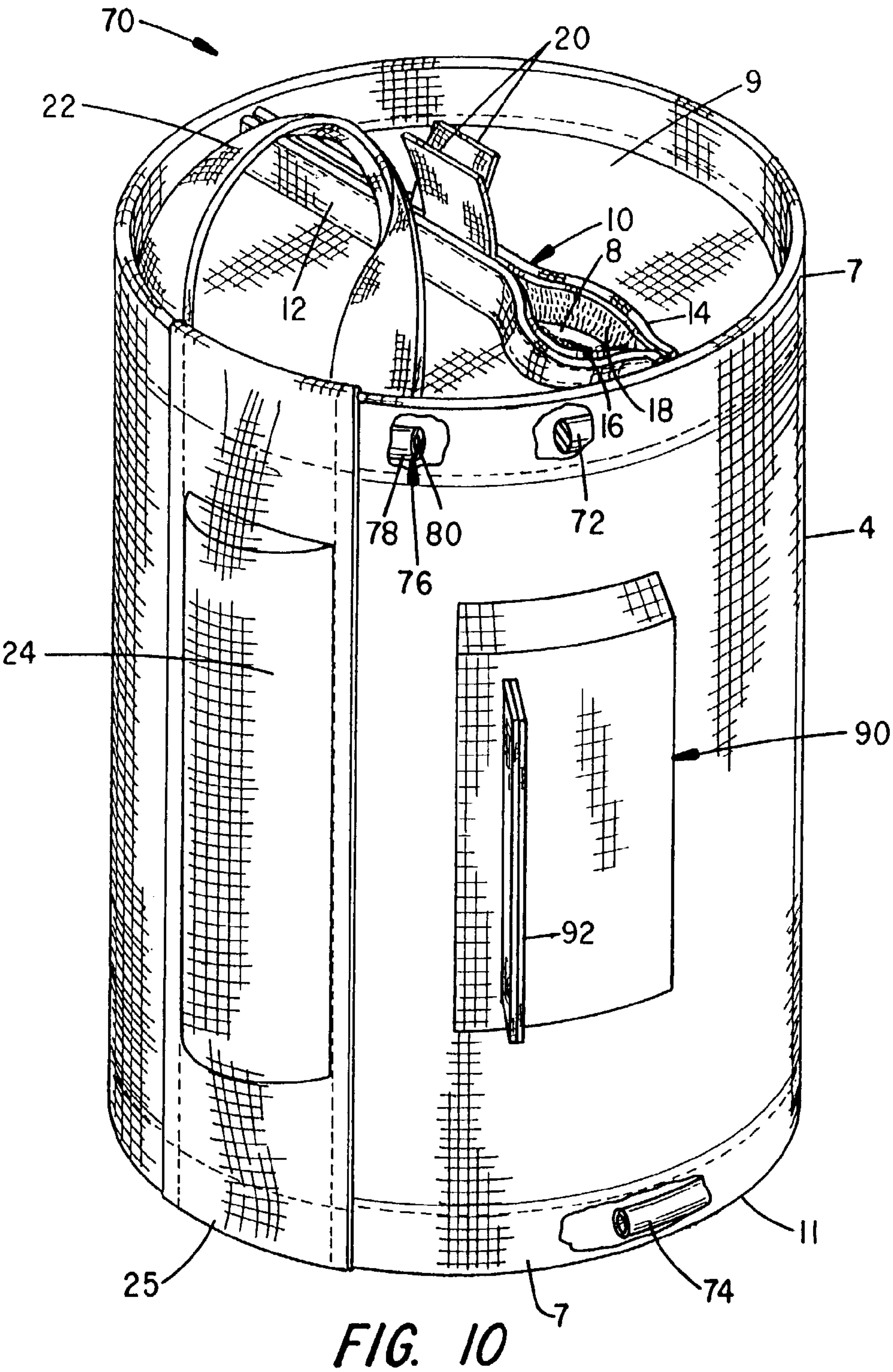
FIG. 10 is a perspective drawing showing a container having alternative types of stays constructed of foam cord, nylon cord/rod stock and a foam covered core piece and a secondary storage compartment.

FIG. 10, lastly depicts a container 70 substantially identical to the container 2 but outfitted with a number of alternative types of stays 72, 74 and 76. The stay 72 is constructed of an open or closed cell foam cord (e.g. ⅜ to 1-inch diameter) that can be secured within the hems 7 at each end 9 and 11, although is only shown at one of the hems 7. A buoyant stay 72 might be used in lieu of the float 24 and/or might be combined with the non-buoyant stays 6.

The stay 74 comprises a solid nylon cord piece that can be secured to the hems 7 in lieu of a flat band 6. The stay 74 can exhibit any desired hollow or solid cross-sectional shape and can be constructed from a polymer, nylon, plastic, polypropylene or other suitably resilient synthetic material that flexes, yet springs back to shape.

The stay 76 comprises a foam outer sheath 78 that is fitted over a solid nylon core 80. The combination stay 76 can be sized to any suitable diameter and resilience required for the size container and can be used in combination with or in lieu of the float 24. The core 80 enhances the rigidity and resilience of the stay 76 and the sheath 78 provides buoyancy and acts as a bumper. Although the stays 6, 72, 74 and 76 are shown as being mounted in the hems 7, they might also be retained with loops or sleeve sections that are permanently or detachably mounted to the walls 4, 9 and 11.

Attached to the wall 4 is a separate pocket or bait compartment 90 that can either be sewn or secured with strips of hook and loop fastener material 94. The access port 92 is sealed with mating strips of hook and loop fastener material that are sewn to the facing flaps. Other strips 94 of hook and loop fastener material 94 might also be provided at the ends of the container 30 to facilitate attachment to adjoining container(s) 30 that are secured with overlapping hinge straps 96.

While the invention has been described with respect to a number of preferred assemblies and considered improvements or alternatives thereto, still other assemblies and rigging arrangements may be suggested to those skilled in the art. It is also to be appreciated that selected ones of the foregoing stays, floats, and/or closure assemblies, among other features, can be used singularly with a live bait container or can be arranged in different combinations to provide a variety of improved bait containers. The foregoing description should therefore be construed to include all those embodiments within the spirit and scope of the following claims.

What is claimed is:

1. A live bait container comprising:

a cylindrically shaped fabric mesh side wall having a top edge and a bottom edge;

a generally circular fabric mesh bottom panel secured to the bottom edge;

a top panel formed by first and second semicircular panels, each panel being made of made of fabric mesh, wherein the first and second semicircular panels further comprise a first and a second arc edge and a first and a second straight edge, the first and second arc edges being attached to the cylindrical wall and recessed from the top edge and the first and second straight edges being attached to a fastener that defines an access port;

a top hem;

a bottom hem;

a flexible resilient stay within the bottom hem;

a vertical seam positioned on a surface of the cylindrical side wall;

a buoyant float sewn into a mesh pocket that is adjacent the side wall; and first and second pull tabs attached to the fastener to facilitate the opening and closing of the access port.

2. The live bait container of claim 1 wherein the fastener comprises strips of hook and loop material.

3. The live bait container of claim 1 wherein a perimeter of the top panel is folded into the top hem.

4. The live bait container of claim 1 wherein a perimeter of the bottom panel is folded into the bottom hem.

* * * * *

UNITED STATES PATENT AND TRADEMARK OFFICE

CERTIFICATE OF CORRECTION

PATENT NO. : 6,990,765 B1
APPLICATION NO. : 10/301772
DATED : January 31, 2006
INVENTOR(S) : Joseph Beech It is certified that error appears in the above-identified patent and that said Letters Patent is hereby corrected as shown below:

On Title page item 56
Under References Cited for Patent No. 2,377,311 delete "Capmbell", insert --Campbell--

Signed and Sealed this

Second Day of January, 2007

JON W. DUDAS
*Director of the United States Patent and Trademark Office*